(12) United States Patent
Kurokawa et al.

(10) Patent No.: US 6,383,423 B1
(45) Date of Patent: May 7, 2002

(54) PROCESS FOR PRODUCING POLYURETHANE MOLDED ARTICLES

(75) Inventors: Masafumi Kurokawa, Ichinomiya; Takayuki Ito, Aichi-ken; Toshihiko Asaya, Nagoya, all of (JP)

(73) Assignee: Toyoda Godei Co., Ltd., Aichi-ken (JP)

( * ) Notice: Subject to any disclaimer, the term of this patent is extended or adjusted under 35 U.S.C. 154(b) by 0 days.

(21) Appl. No.: 09/522,064

(22) Filed: Mar. 9, 2000

(30) Foreign Application Priority Data

Mar. 31, 1999 (JP) .......................... 11-090977
Sep. 29, 1999 (JP) .......................... 11-276193

(51) Int. Cl.⁷ .................... B29C 44/06; B29C 45/16
(52) U.S. Cl. ................. 264/46.4; 264/45.5; 264/102; 264/255
(58) Field of Search ................. 264/255, 102, 264/45.5, 46.4, 259

(56) References Cited

U.S. PATENT DOCUMENTS

| 4,389,454 A | * | 6/1983 | Horacek et al. ............ 264/255 |
| 4,647,274 A | | 3/1987 | Oda |
| 5,000,902 A | * | 3/1991 | Adams ........................ 264/255 |
| 5,116,557 A | * | 5/1992 | Debaes et al. ............... 264/255 |
| 5,192,481 A | * | 3/1993 | Morita ........................ 264/255 |
| 5,628,944 A | | 5/1997 | Nagasaka et al. |
| 5,662,996 A | | 9/1997 | Jourquin et al. |
| 5,962,142 A | | 10/1999 | Tachi et al. |

FOREIGN PATENT DOCUMENTS

| DE | 297 14 358 U1 | 11/1997 |
| EP | 0 472 312 A2 | 2/1992 |
| EP | 0 661 146 A2 | 7/1995 |
| EP | 0 771 642 A1 | 5/1997 |
| EP | 0 781 643 a2 | 7/1997 |
| JP | 06/071769 | 3/1994 |
| JP | 06/143340 | 5/1994 |
| JP | 09/183138 | 7/1997 |

OTHER PUBLICATIONS

Database WPI Section Ch, Week 9630 Derwent Publications Ltd., London, GB; Class A32, AN 1996–295078 XP002112468;JP 08 127038A.
Patent Abstracts of Japan vol. 1999, No. 02, Feb. 26, 1999 & JP 10 309733 A (Toyoda Gosei Co Ltd), Nov. 24, 1998.

* cited by examiner

Primary Examiner—Allan R. Kuhns
(74) Attorney, Agent, or Firm—Pillsbury Winthrop, LLP

(57) ABSTRACT

A process for injecting a urethane material into a mold cavity from a gate to mold articles. Urethane molded articles are produced by first forming a coating film layer on the inside surface of a mold cavity. Next, a first urethane material containing pigment is injected into the cavity. Finally, a second urethane material containing more pigment than the first urethane material is injected into the cavity.

12 Claims, 16 Drawing Sheets

PROCESS FOR PRODUCING POLYURETHANE MOLDED ARTICLES

BACKGROUND OF THE INVENTION

The present invention relates to a process for reaction injection molding (RIM) of two-colored molded articles having different properties, such as color, between the surface and inside portions using polyurethane.

Such a molding process, as described below, has been proposed in U.S. Pat. No. 5,628,944.

In a first step, the cavity of a mold is depressurized (evacuated).

In a second step, a first polyurethane material for the surface of the article is injected from a gate into the cavity under reduced pressure. The injected first polyurethane material is allowed to flow into the cavity after foaming under reduced pressure. It adheres in the form of a thin film over substantially the entire inner surface of the cavity due to break up of the foam, which forms a fine surface that is essentially free of air bubbles.

In a third step, a second polyurethane material for the inside of the article is injected from a gate into the cavity under a vacuum. The injected second polyurethane material flows into and fills the cavity where it reacts and is cured, which forms the inside of a two-colored molded article.

This two-colored molding process makes it possible to easily form a two-colored molded article in which a surface portion that contains a pigment covers an inside portion that contains no pigment. However, when the gate residue is cut away from the two-colored molded article, the non-colored inside is visible at the cut, which produces a poor appearance due to the conspicuous difference in color from the surface portion. In addition, when the first polyurethane material adhering to the inner surface of the cavity still has fluidity in the second step, the first polyurethane material adhered to the cavity surface, near the gate in particular, is carried away by the second polyurethane material, which reduces thickness of the first material when the second polyurethane material is injected in the third step. As a result, the surface at that site becomes transparent and the non-colored inside is visible. This results in a conspicuous coloration difference.

Therefore, a molding process has been proposed as described below (Japanese Unexamined Patent Publication No. Hei 9-183138). This process contains the steps listed below.

(1) A step of depressurizing the cavity of a mold;
(2) an initial step of injecting a small amount of a first polyurethane material containing a pigment into the cavity under reduced pressure to form the surface portion of a molded article;
(3) an intermediate step of injecting a second polyurethane material containing no pigment into the cavity under reduced pressure to form the majority of the inside of a molded article; and
(4) a final step of injecting a small amount of polyurethane material for the portion near the gate that contains a pigment into the cavity under reduced pressure to form the portion of the inside of the molded article near the gate.

Although the above-mentioned problems of color differences resulting from cutting away the gate residue and decreased thickness of the surface portion at sites near the gate are solved by this two-colored molding process, consideration has not been given to problems like those described below.

Molds used for RIM polyurethane molding are normally split molds. Since a gap exists between the facing surfaces of the upper and lower dies, a burr 100 is formed as shown in FIG. 18. Since this burr 100 has a three-layer cross sectional structure, in which a second, non-pigmented, polyurethane material 102 is between two layers of a first, pigmented, polyurethane material 101, when a finishing process is performed by cutting away the burr 100 along the broken line of FIG. 18(*a*), the non-colored second polyurethane material 102 is exposed in the form of a band as shown in FIG. 18(*b*) and FIG. 18(*c*). This produces a conspicuous color difference with the first polyurethane material 101 and flaws the appearance.

In addition, to prevent the non-colored second polyurethane material 102 from being seen through the first polyurethane material 101, it is necessary to increase the pigment concentration in the first polyurethane material 101. In FIG. 18(*b*), the diagonally hatched squares schematically illustrate pigment particles 103 that have a high density (high pigment concentration). In addition, since the thickness of the surface portion at sites near the gate decreases over a certain range, a considerable amount of polyurethane material is required for the portion near the gate, and it is also necessary to increase the pigment concentration in the polyurethane material for the portion near the gate. Thus, the required amount of pigment is high, which increases costs and accelerates the wear of equipment and jigs (such as mixing heads), depending on the type of pigment granules.

SUMMARY OF THE INVENTION

Therefore, it is an object of the present invention to provide a process for producing polyurethane molded articles that reduces the total amount of pigment used to reduce costs and reduce wear of equipment and jigs while preventing conspicuous color differences due to cutting away gate residue and thinning of the surface portion at sites near the gate.

The present invention provides a process for injecting a urethane material from a gate into a cavity of a mold and molding articles. In a first step, a surface layer is formed on the inner surface of the cavity with the mold closed. Next, a first urethane material containing a pigment is injected into the cavity. Then, a second urethane material containing more pigment than the first urethane material is injected into the cavity to produce a urethane molded article.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Figure 1:
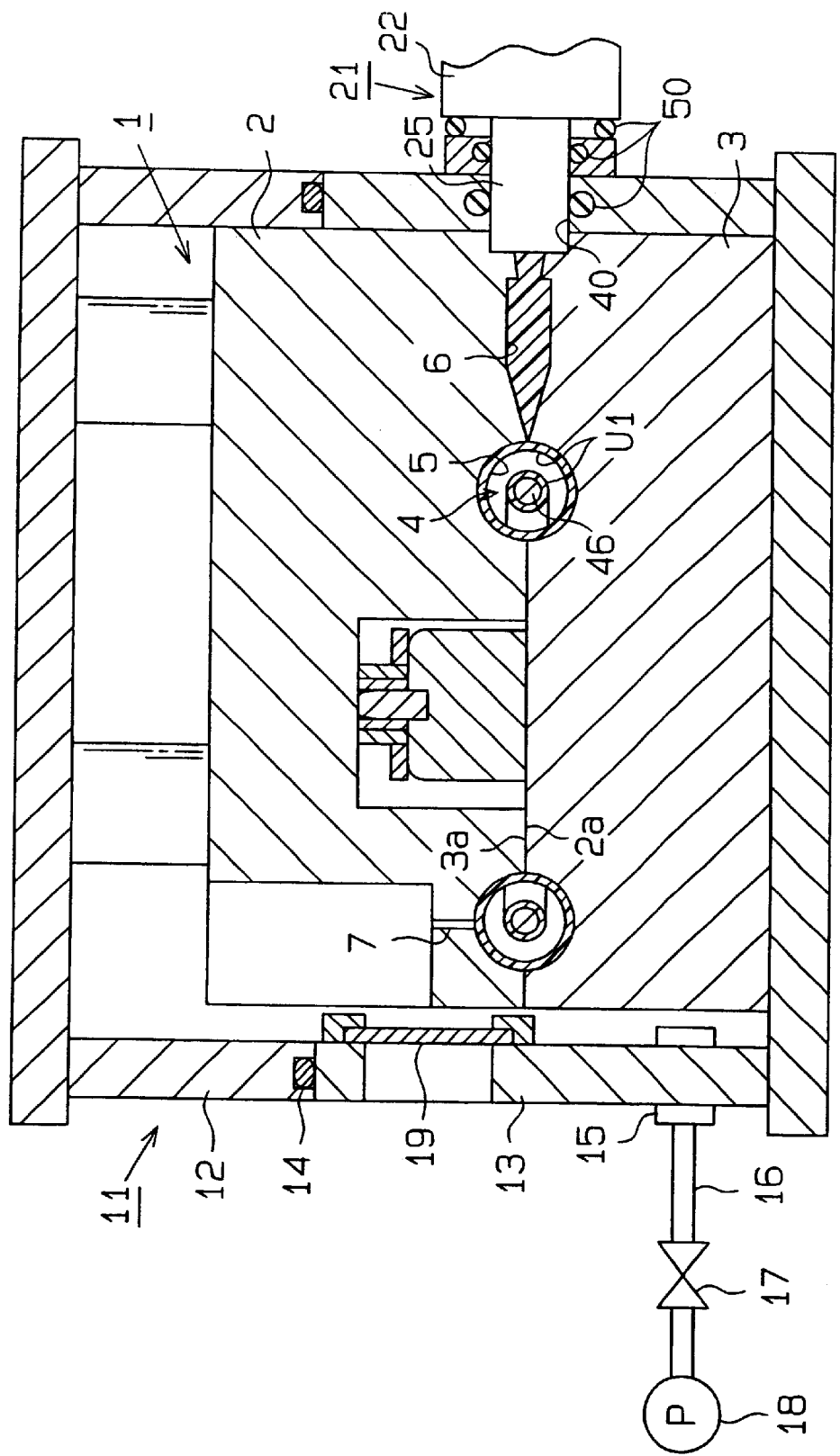
FIG. 1 is a cross-sectional view showing an initial step of forming a surface portion of a polyurethane covering of a steering wheel in a first embodiment.

The following describes specific embodiments of the present invention for molding a polyurethane covering of a steering wheel based on FIGS. 1 through 9. To begin with, as shown in FIGS. 1 through 6, the molding apparatus includes a molding die 1, a box 11 and a material injection mechanism 21, detailed descriptions of which are provided below in order.

The molding die 1 is formed in the form of a split mold consisting of an upper die 2 and a lower die 3. An indentation 5 that forms a ring-shaped cavity 4 when the die is closed and a gate 6 leading to the cavity 4 are formed in split surfaces 2a and 3a of the lower die 3 and the upper die 2. A vent hole 7 is formed at the final filling position of polyurethane in the upper die 2.

The box 11 is formed into two parts consisting of a cover 12 and a frame 13. The upper die 2 is installed inside the cover 12, and the lower die 3 is installed inside the frame 13. The cover 12 and the frame 13 are attached to an unillustrated mold clamping device, and in the present embodiment, raising and lowering of the frame 13 causes the cover 12 and the frame 13 to move together or apart, which closes or opens the upper die 2 and the lower die 3. An O-ring 14 is installed in a groove formed in a joint surface of the cover 12, and the O-ring 14 seals the space between the cover 12 and the frame 13 by contacting a joint surface of the frame 13 when the box 11 is closed.

A suction plug 15 is installed in the frame 13, and a vacuum pump 18 is connected to this suction plug 15 by means of a suction hose 16 and a valve 17. In addition, an air tight observation window 19 is provided in the frame 13 to allow the area near the vent hole 7 to be visible from outside of the box 11.

Figure 6:
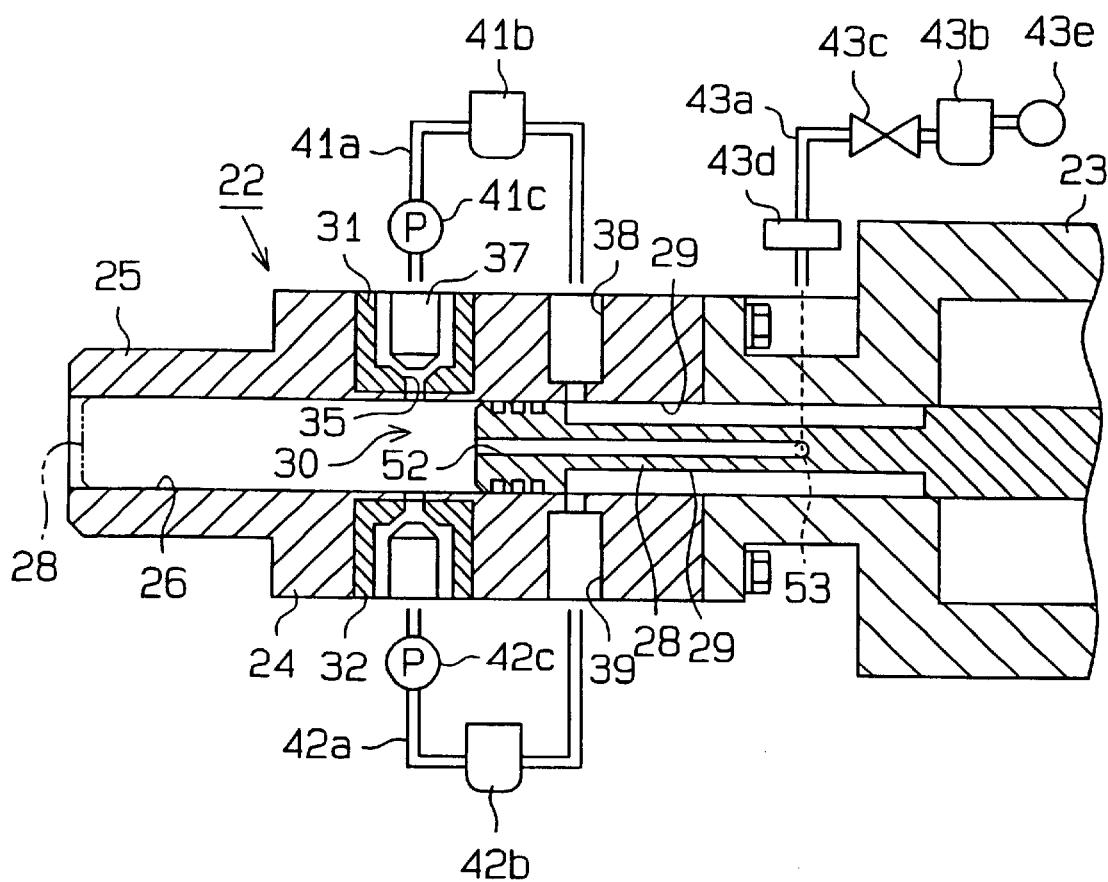
FIG. 6 is a cross-sectional view of a mixing head used for molding.

A material injection mechanism 21 is provided with a three-component mixing head 22, as shown in FIG. 6, that allows mixing of two primary components and a secondary component. Therefore, three components are mixed. The primary components are polyole and isocyanate. The three-component mixing head 22 includes a cylinder 23 and a body 24 installed on its end. The body 24 has a narrow injection nozzle 25 on its end.

A through hole 26 is formed in the center of the body 24, and a spool 28, which is attached to a piston (not shown) in the cylinder 23, is inserted into the through hole 26. The spool 28 can slide freely. A pair of slots 29 extending in the lengthwise direction are located 180 degrees apart in the outside of the spool 28. As a result of the reciprocating movement of the piston 27, the spool 28 slides between an advanced position, which is indicated with the double-dot broken line in FIG. 6, and a retracted position, which is indicated with a solid line. When the spool 28 is retracted, a mixing chamber 30 for the components is formed in front of the spool 28.

A cylindrical nozzle 31 for the polyole component and a cylindrical nozzle 32 for the isocyanate component are provided in opposition inside the body 24. A tapered orifice 35 that opens to the mixing chamber 30 or one of the slots 29 is formed in each nozzle 31 and 32. Holders (not shown) that hold each nozzle 31 and 32 are installed on the outer surface of the body 24, and the end of a needle 37 is used to adjust the opening of the corresponding orifice 35. In addition, a reflux hole 38 for the polyole component and a reflux hole 39 for the isocyanate component are formed next to the nozzles 31 and 32 of the body 24, and each hole 38, 39 opens into a corresponding one of the slots 29.

A tank 41b and a pump 41c for the polyole component are connected by a hose 41a to the nozzle 31 and the reflux hole 38, and a circulation path for the polyole component includes the tank 41b, the pump 41c, the nozzle 31, one of the slots 29, and the reflux hole 38. An isocyanate tank 42b and a pump 42c are connected to the nozzle 32 and the reflux hole 39 by a hose 42a, and a circulation path for the isocyanate component includes the tank 42b, the pump 42c, the nozzle 32, the slot 29, and the reflux hole 39.

An auxiliary discharge hole 52 for the third component is provided in the center of the spool 28. The front end of the auxiliary discharge hole 52 opens at the end surface of the spool 28, while the back end opens to the circumferencial surface of an intermediate portion of the spool 28. An introducing hole 53, which connects with the back opening of the auxiliary discharge hole 52 only when the spool 28 retracts, is formed in the rear portion of the body 24. A third component tank 43b is connected to the introducing hole 53 by a hose 43a through a flow rate adjustment device 43d and a valve 43c, and the inside of the tank 43b is normally pressurized by an air pressure device 43e. The valve 43c may be provided at any location between the tank 43b and the body 24. There are no restrictions on the driving method of the valve 43c. A pneumatic or electrical valve, for example, may be used. Opening and closing the valve 43c is controlled with a dedicated timer or internal sequence timer.

Incidentally, the third component, which is coloring material, is pigment dispersed in a polyole material.

The injection nozzle 25 of the three-component mixing head 22 is connected to the gate 6 of the lower die 3 via a through hole 40 formed in the frame 13. The three-component mixing head 22 and the through hole 40 are sealed by a plurality of O-rings 50.

Figure 7A:
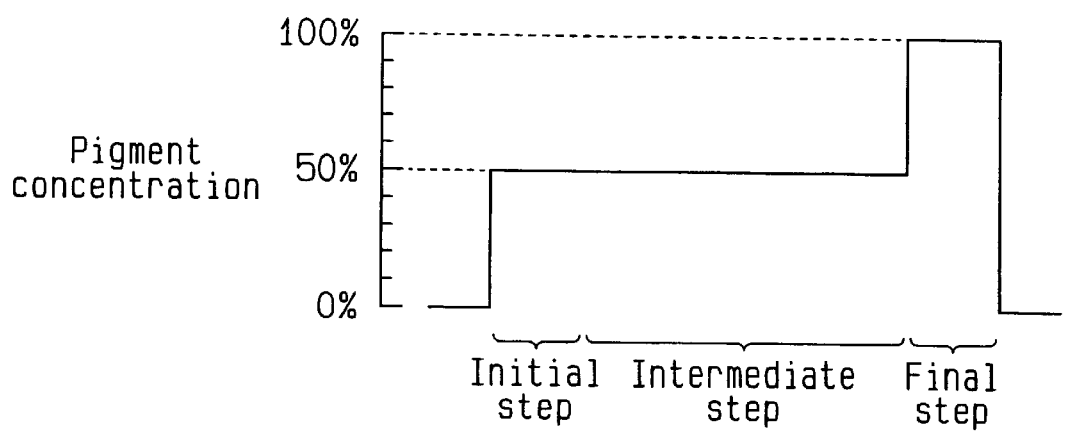
FIGS. 7(a)–(b) are timing charts showing the changes in pigment concentration during molding.
Figure 7B:
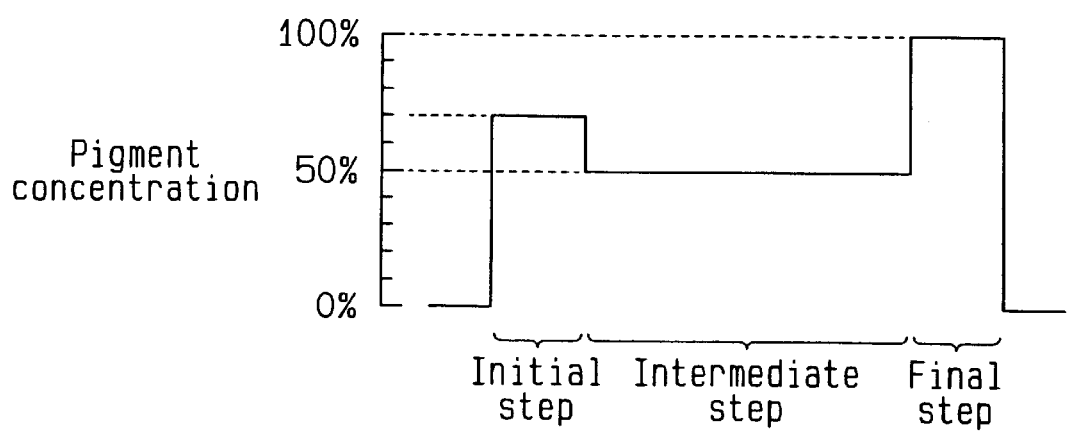

Next, a RIM polyurethane two-colored molding process that uses the above-mentioned molding apparatus will be described in order. FIGS. 7(a) and 7(b) are two patterns of timing charts that indicate changes in pigment concentration within the polyurethane material during molding.

(1) The upper die 2 and the lower die 3 of molding die 1 are opened and a mold releasing agent is applied to the indentation 5.

(2) After placing a core bar 46 of the steering wheel 45 in the lower die 3, the upper die 2 and the lower die 3 are closed to form the cavity 4, and at the same time, the cover 12 and the frame 13 are closed to seal the box 11.

(3) The inside of the box 11 is depressurized to a suitable degree of vacuum by the vacuum pump 18 and a vacuum atmosphere is created in the cavity 4 through the vent hole 7. The degree of vacuum varies according to the composition of the polyurethane material, the dimensions of the molded articles and so forth, and although there are no particular restrictions on this vacuum, it was set at 50 torr or less in the present embodiment.

(4) Initial step: The spool 28 is retracted and the polyole component is discharged from the nozzle 31 while the isocyanate component is discharged from the nozzle 32, both into the mixing chamber 30. In addition, the valve 43c opens and the third component or the coloring material, is discharged from the auxiliary discharge hole 52 into the mixing chamber 30. These components are mixed by collision to prepare a first polyurethane material U1 for the surface portion of the molded article.

The concentration of the pigment in the first polyurethane material U1 was set at 50% of the standard concentration in the pattern of FIG. 7(a), and at 70% of the standard concentration in the pattern of FIG. 7(b). In this embodiment, the first polyurethane material U1 is substantially free of foaming agent. Here, the standard concentration for the pigment refers to the pigment concentration in a polyurethane material U3 for molding near the gate.

A mold releasing agent and/or a catalyst can be mixed into the first polyurethane material U1 and the polyurethane material U3 for molding near the gate. In addition, the first polyurethane material U1 can be made to be a high-performance material in comparison with a second polyurethane material U2. An example of the high-performance material is a non-yellowing material. Further, the first polyurethane material U1 can be made to have a higher urethane reaction rate than the second polyurethane material U2.

As shown in FIG. 1, while continuing evacuation in the cavity 4, a small amount of the first polyurethane material U1 is injected into the cavity 4 from the injection nozzle 25. After rapid foaming of the injected first polyurethane material U1 due to the action of naturally occluding gas (and the action of a foaming agent if a foaming agent is used) in the material, caused by the vacuum pressure, and flow over substantially the entire inside of the cavity 4, the foam breaks up causing a film of the first polyurethane material U1 to adhere to substantially the entire surface of the indentation 5, which forms the surface portion 48 of the polyurethane covering 47.

(5) Intermediate step: The polyole component, the isocyanate component and the coloring material are discharged in the same manner as in the initial step, after which they are mixed by collision to produce a second polyurethane material U2 for the inside portion of the molded article. The pigment concentration in the second polyurethane material U2 resulting from discharge of the coloring material was set to 50% of the standard concentration for both patterns of FIGS. 7(a) and 7(b). Furthermore, in the present embodiment, this second polyurethane material U2 is also substantially free of foaming agent.

Figure 2:
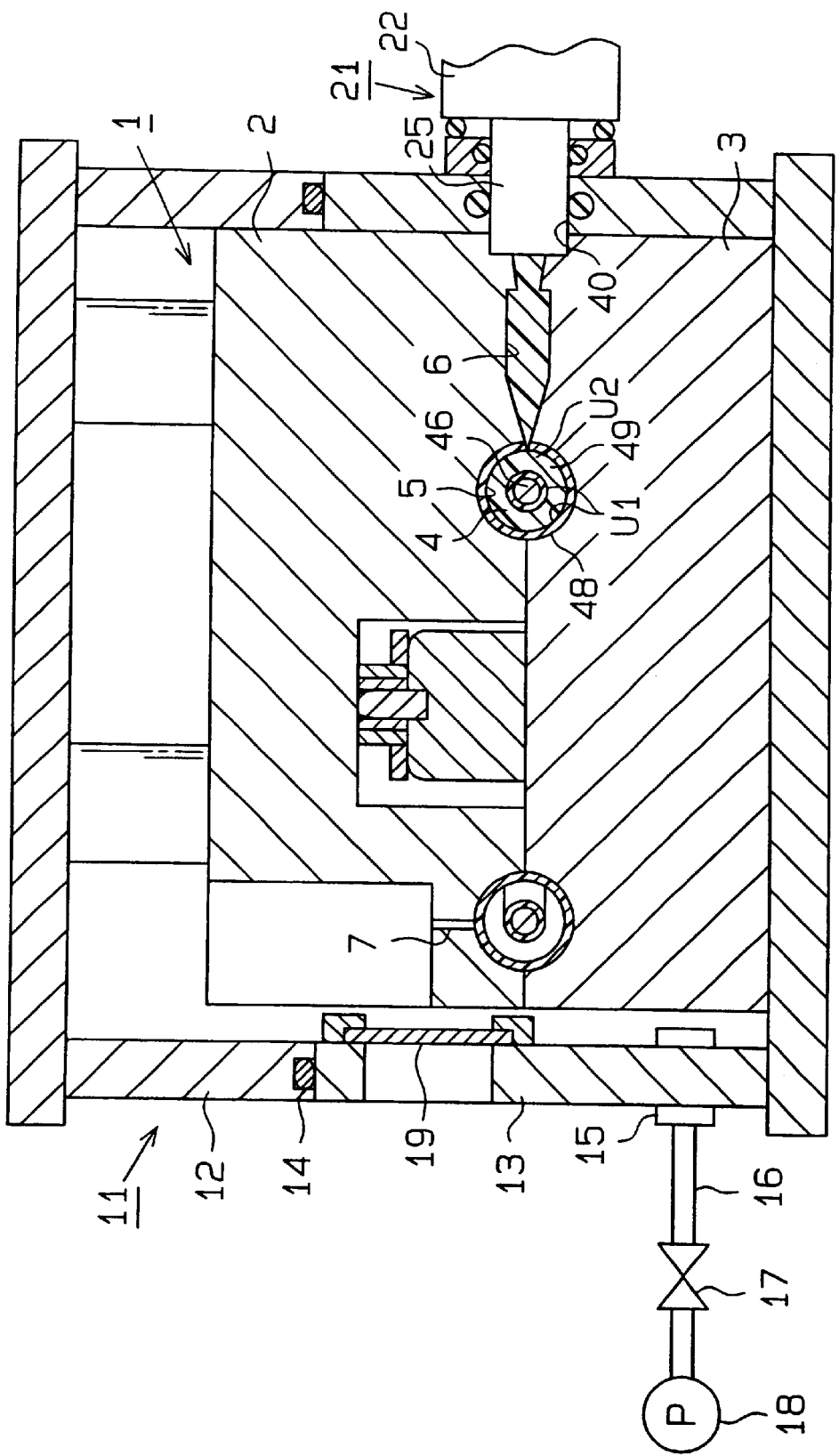
FIG. 2 is a cross-sectional view of a mold in an intermediate step of forming the inside portion of a polyurethane covering.

As shown in FIG. 2, while continuing evacuation in the cavity 4, the second polyurethane material U2 is injected into the cavity 4 from the injection nozzle 25. The injected second polyurethane material U2 foams due to the action of naturally occluding gas in the material caused by the vacuum and forms the majority of the high foaming portion 49a of the inside 49 of the polyurethane covering 47 (see FIG. 5).

(6) Final step: Just before the above-mentioned second polyurethane material U2 completely fills the cavity 4, the polyole component, the isocyanate component and the coloring material are discharged in the same manner as in the initial step, followed by collision mixing, to produce a third polyurethane material U3 for molding near the gate (see FIG. 7). The pigment concentration of the third polyurethane material U3 resulting from discharge of the coloring material was set to be equal to the standard concentration for both patterns of FIGS. 7(a) and 7(b).

Figure 3:
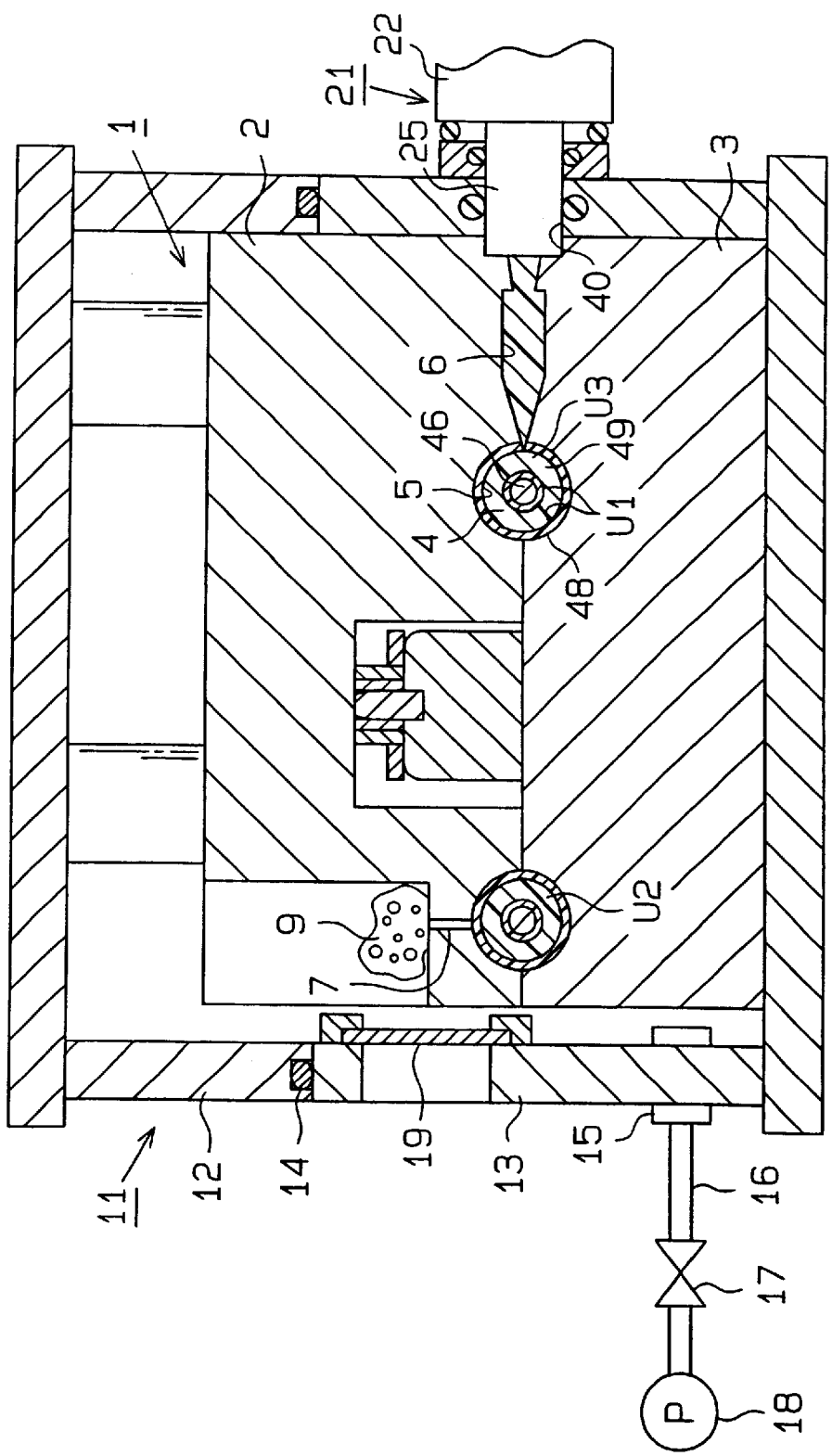
FIG. 3 is a cross-sectional view of a mold in a final step of forming a portion near the gate of a polyurethane covering.

As shown in FIG. 3, while continuing evacuation in the cavity 4, the third polyurethane material U3 is injected into the cavity 4 from the injection nozzle 25. The injected third polyurethane material U3 for molding near the gate foams in substantially the same manner as the second polyurethane material U2 to form the high foaming portion 49b near the gate, which is the remainder of the inside 49 of the polyurethane covering 47 (see FIG. 5).

Figure 4:
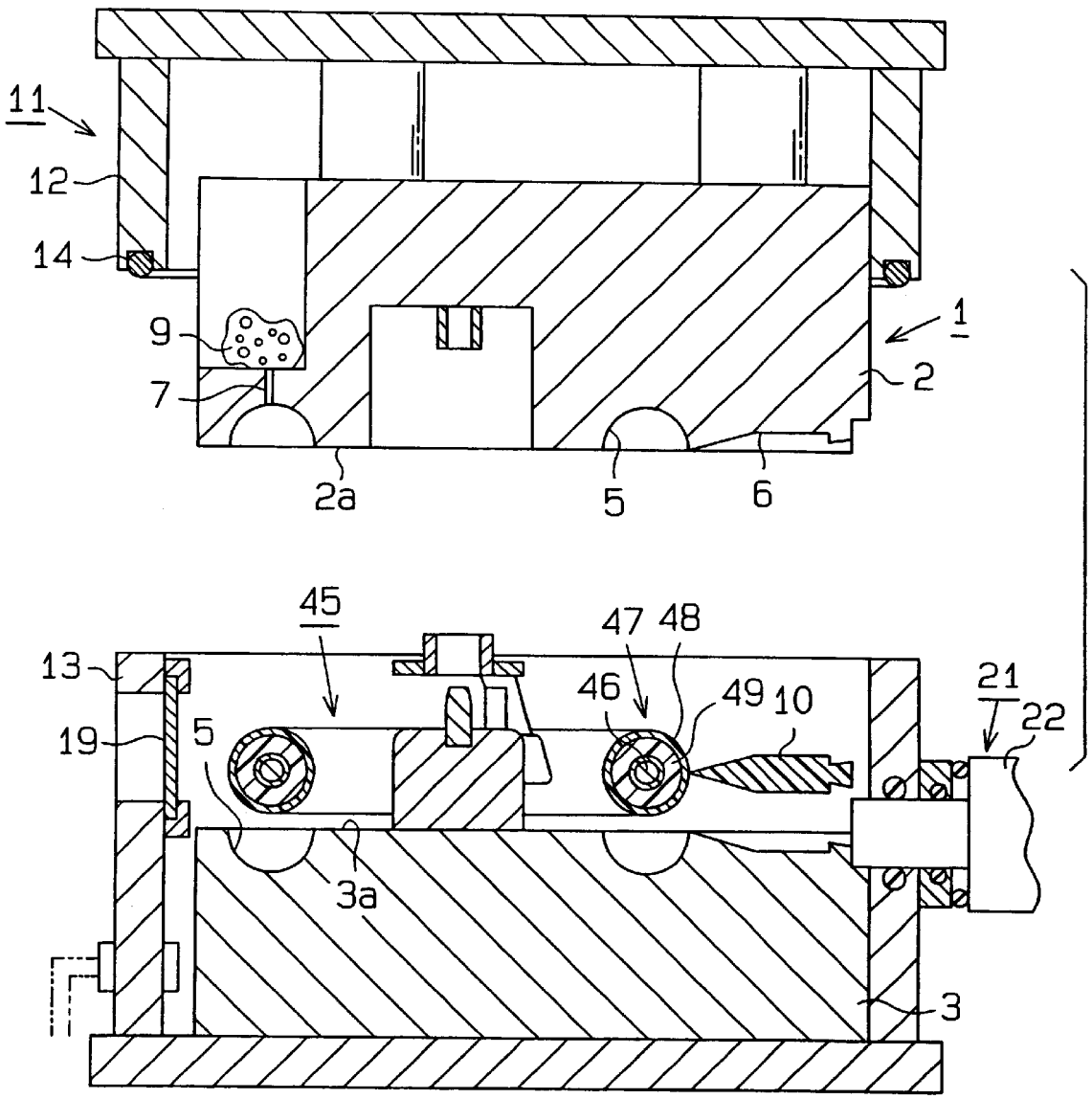
FIG. 4 is a cross-sectional view of a mold in a mold release step.

As a result of the injection of the third material U3, the cavity 4 is filled with the materials U1, U2 and U3, and a small amount of the second polyurethane material U2 is blown out of the vent hole 7 and cured to form a blowout portion 9 (FIG. 4).

Figure 5:
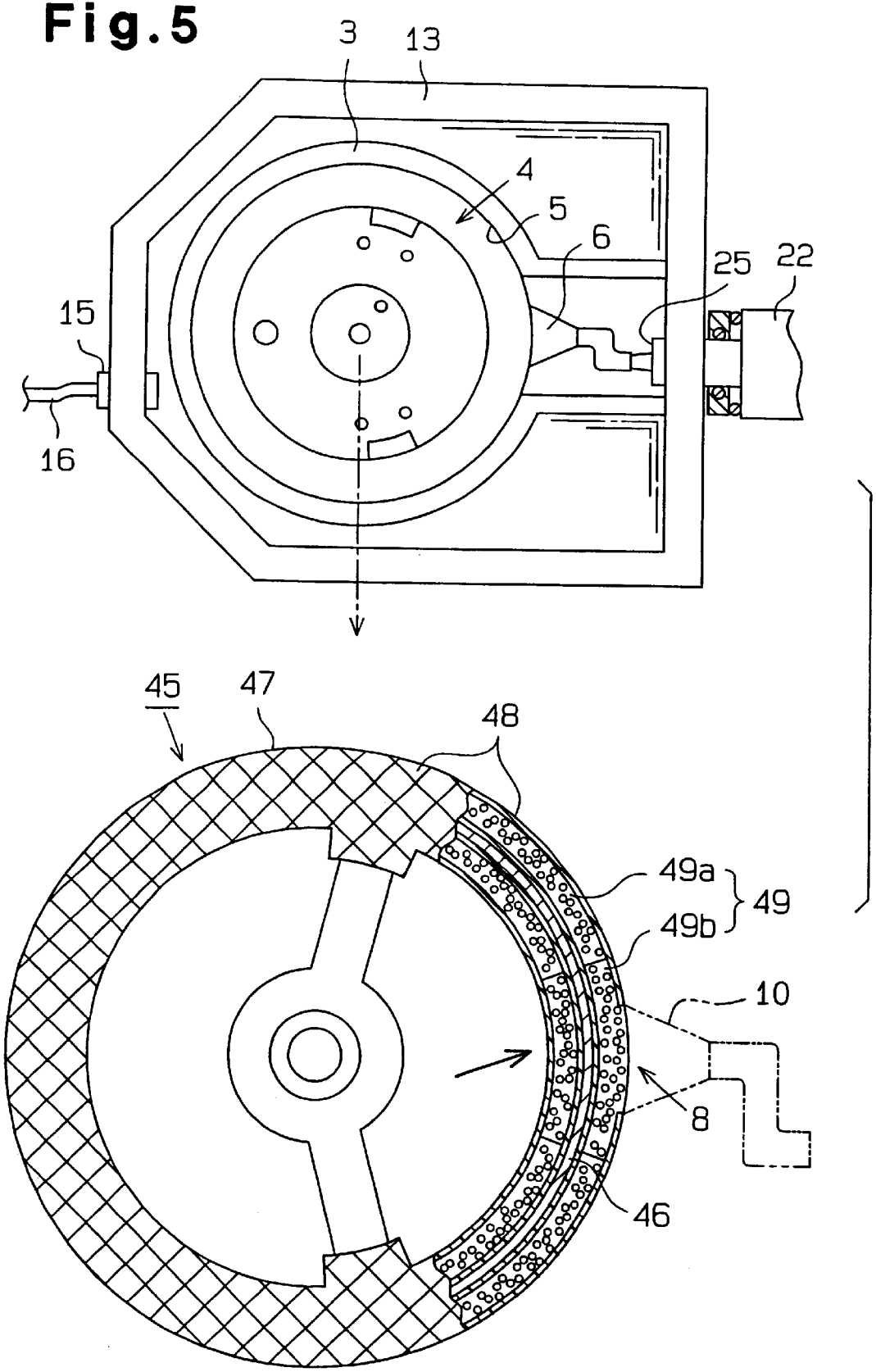
FIG. 5 is a plan view of a mold in a mold release step.

(7) Subsequent to closing the upper die 2 and the lower die 3, as shown in FIG. 4, after waiting for the materials U1, U2 and U3 to cure, the cover 12 and the frame 13 are opened and the steering wheel 45, which has the polyurethane covering 47, is taken out, as shown in FIG. 5. In FIG. 5, the steering wheel 45 has been enlarged relative to the lower die 3.

The following actions and effects (1) through (5) are obtained according to the present embodiment.

Figure 18A:
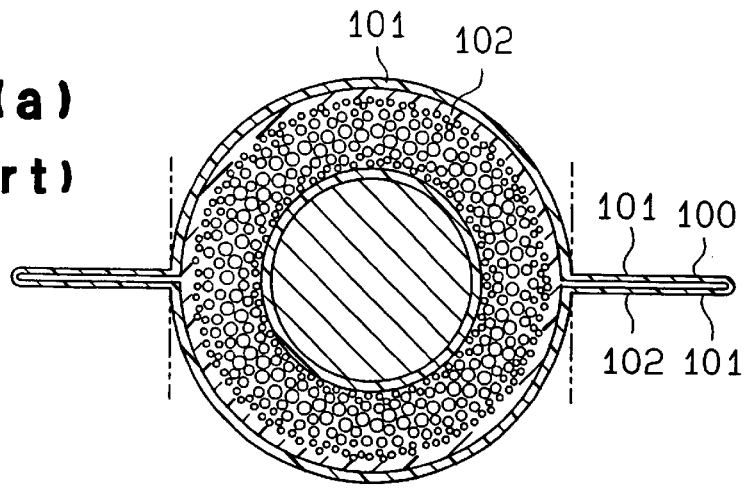
FIG. 18(a) is a cross-sectional view of a portion of a polyurethane covering according to the prior art.
Figure 18B:
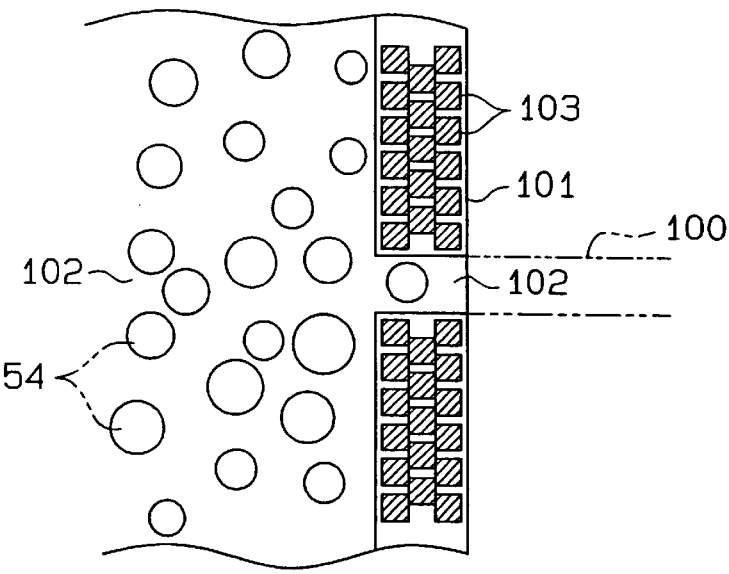
FIG. 18(b) is a partial enlarged cross-sectional view of FIG. 18(a)
Figure 18C:
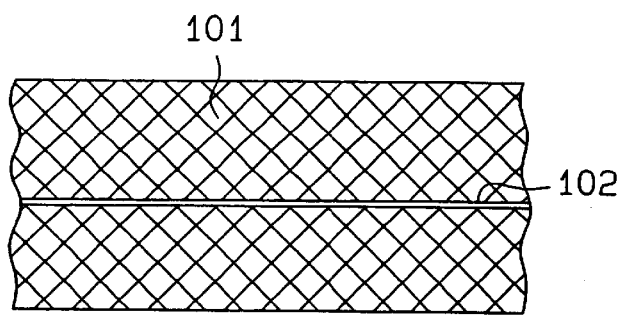
FIG. 18(c) is a partial front view of a prior art polyurethane covering.

(1) Since the pigment concentration in the first polyurethane material U1 is either 50% or 70% of the standard concentration, the amount of pigment is reduced by 50% or 30% in comparison with the prior art method. In FIG. 9(b), the hatched squares schematically illustrate pigment particles 73, and the density of the pigment particles 73 in the surface portion 48 is lower than that of the pigment particles 103 in the surface portion of FIG. 18(b) (the pigment concentration is relatively lower). However, since there are hardly any air bubbles in the surface portion 48, even if the pigment concentration is 50% or 70% of the standard concentration, the pigment particles 73 have significant density and conceal the inside 49 to a considerable extent. Moreover, although the pigment concentration in the second polyurethane material U2 is 50% of the standard concentration, and the color is lighter than the surface portion 48 due to foaming, it is colored to a certain extent. Thus, although the majority portion 49a of the inside 49 can be seen somewhat through the surface portion 48, since the color of the surface portion 48 and the color of the majority portion 49a can be seen as the total concentration of pigment, it appears to be colored to the same degree as that of the prior art shown in FIG. 18.

(2) The gate residue 10 is present on the polyurethane covering 47 of the third polyurethane material U3 near the gate, and when this is cut away, the foamed portion 49b near the gate formed by the third polyurethane material U3 appears at the cut 8. However, since the portion 49b near the gate is colored with the pigment of the standard concentration, the color of the cut 8 is the same as that of the surface portion 48, making it virtually unnoticeable.

Figure 8A:
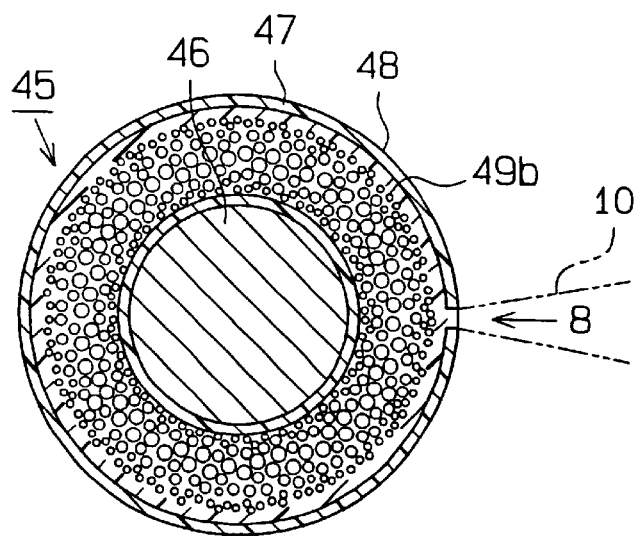
FIG. 8(a) is a cross-sectional view of a site near the gate of a polyurethane covering.
Figure 8B:
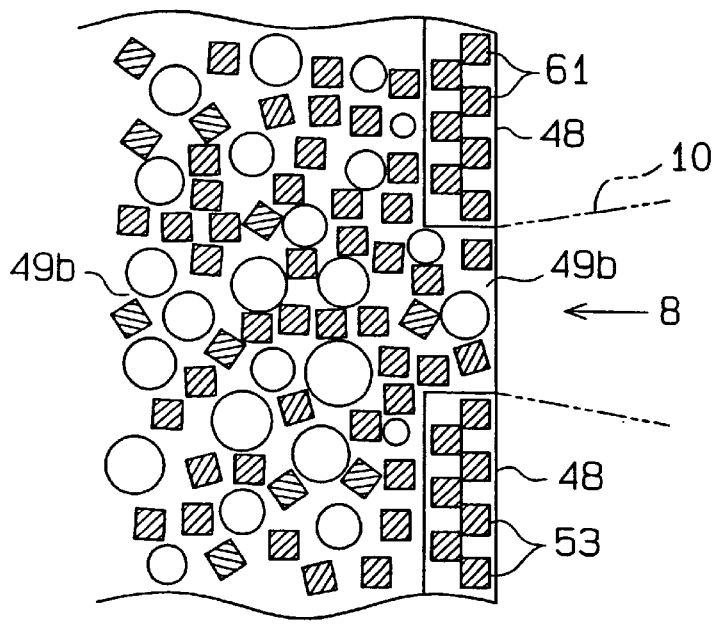
FIG. 8(b) is a partial enlarged cross-sectional view of (a)
Figure 8C:
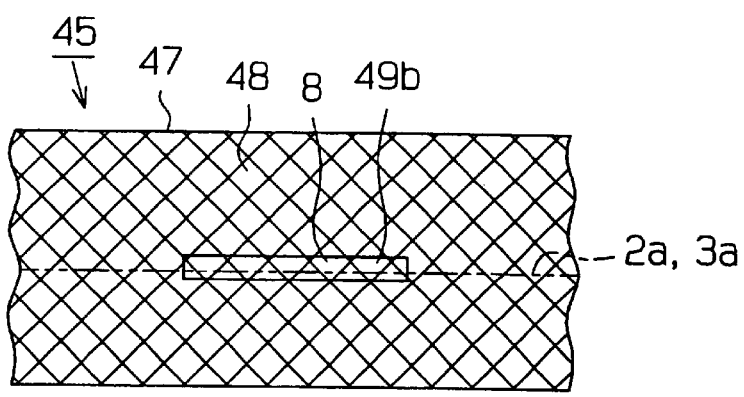
FIG. 8(c) is a partial front view of the polyurethane covering.

(3) In addition, if the surface portion 48 near the gate becomes thinner due to the flow of the second polyurethane material U2 in the intermediate step of FIG. 8(b) due to a delay in reaction and curing of the first polyurethane material U1, the portion 49b near the gate formed by the third polyurethane material U3 is visible through the site where the thickness has been reduced. However, since the portion 49b near the gate is colored with the pigment of the standard concentration, the appearance is not impaired.

Incidentally, to prevent such thinning of the surface portion 48 near the gate, a material having a high urethane reaction rate should be used for the first polyurethane material U1 such as by adding a catalyst that accelerates the urethane reaction to the third component of the first polyurethane material U1. In addition, in order to improve the light resistance of the surface portion 48, a non-yellowing material having a high degree of light resistance should be used for the first polyurethane material U1.

Figure 9A:
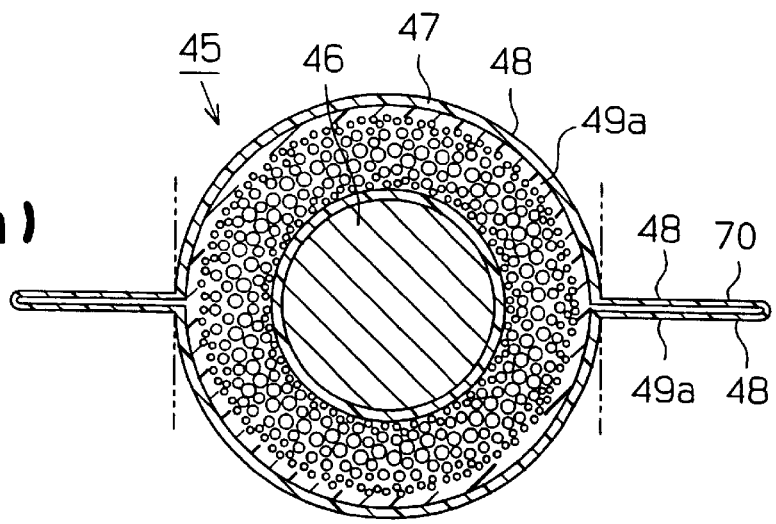
FIG. 9(a) is a cross-sectional view of a typical portion of a polyurethane covering.
Figure 9B:
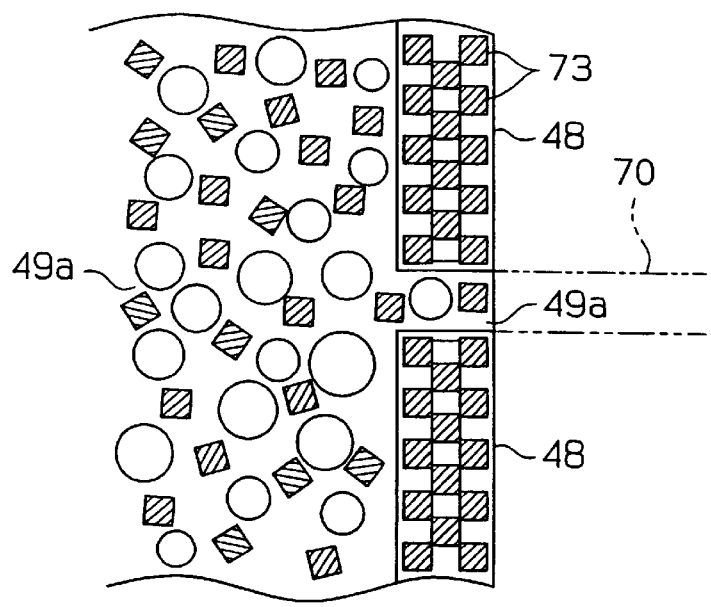
FIG. 9(b) is a partial enlarged cross-sectional view of FIG. 9(a)
Figure 9C:
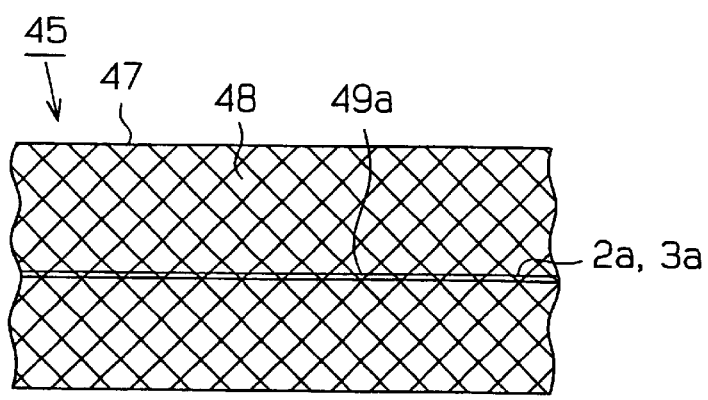
FIG. 9(c) is a partial front view of a polyurethane covering.

(4) Since a gap exists between the mold surfaces 2a and 3a of the upper die 2 and the lower die 3, a burr 70 is formed as shown in FIG. 9(a). Since this burr 70 has a three layer cross-sectional structure in which a layer of the second polyurethane material U2 is between two layers of the first polyurethane material U1, when this burr 70 is cut away along the broken line of FIG. 9(a), the foamed majority portion 49a of the inside 49 is exposed in the form of a line at the cut. However, since the pigment concentration in the second polyurethane material U2 is 50% of the standard concentration, the majority portion 49a is colored to a significant extent, and this line is extremely thin in comparison with the cut 8 of the gate residue 10 described in (2) above, the color difference between this line of the majority portion 49a and the surface portion 48 is virtually unnoticable and does not impair the appearance.

(5) Since the pigment concentration in the first polyurethane material U1 can be reduced, and the amount of the third polyurethane material U3 for molding near the gate having the standard concentration of pigment is less than that in the prior art since the majority portion 49a of the inside 49 colored to a certain extent, even when considering the amount of pigment used in the second polyurethane material U2, the amount of pigment used overall is reduced in comparison with the prior art, which reduces costs.

In addition, although the pigment particles cause abrasion at the location where they pass through the material injection mechanism 21, the amount of coloring pigment used is reduced. Thus, the degree of abrasion is reduced, which extends the maintenance and part replacement cycles of the material injection mechanism 21 while reducing labor and costs.

If the third component valve 43c is provided between the tank 43b and the air pressure device 43e in the above-mentioned material injection mechanism 21 and this valve 43c is opened and closed at the same timing described above, effects similar to those described above are achieved.

Figure 10:
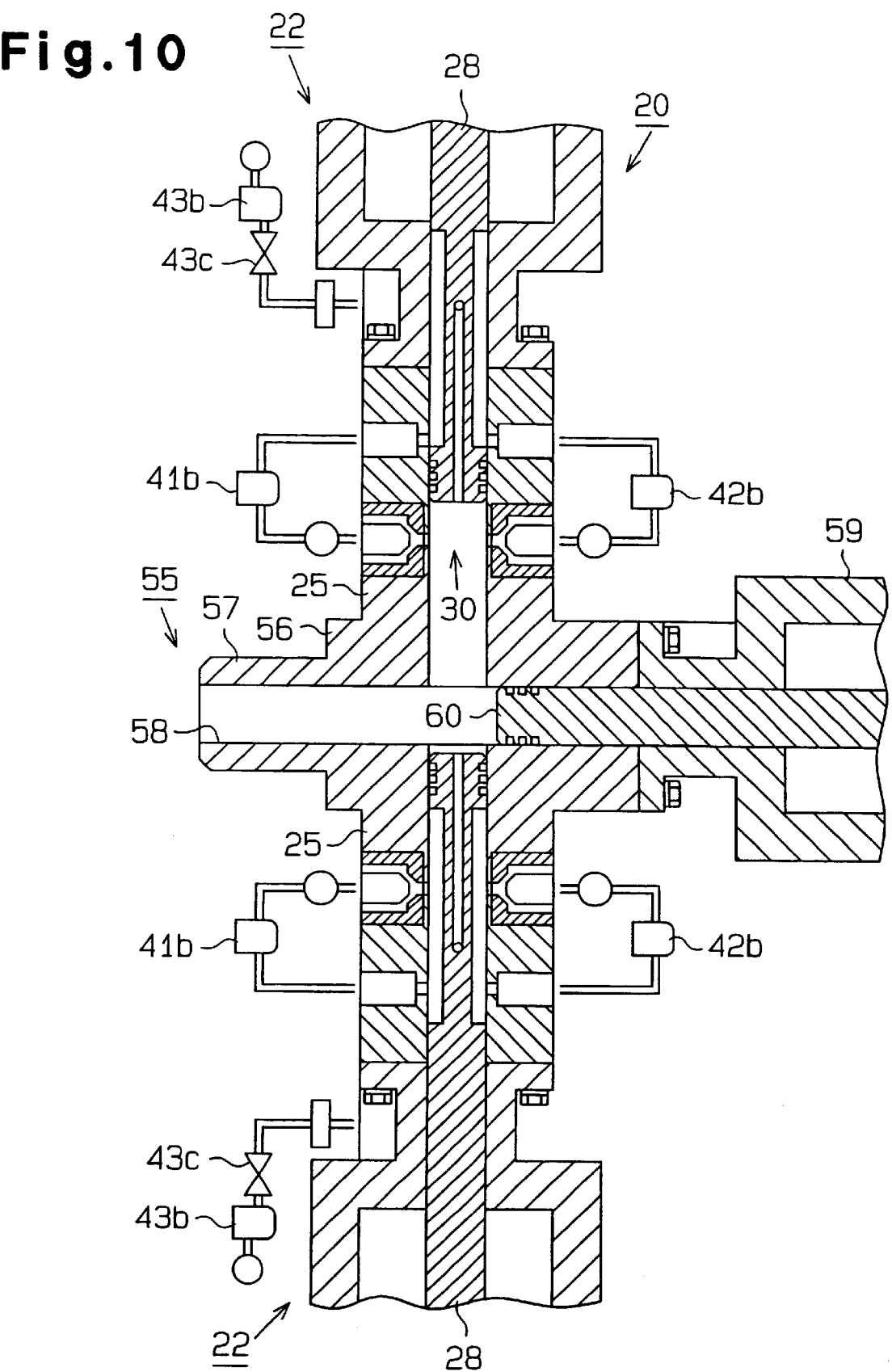
FIG. 10 is a cross-sectional view of a modified example of a mixing head.

In addition, as shown in FIG. 10, a six-component mixing head 20, in which two three-component mixing heads 22 are connected to a center injection mechanism 55, can also be used. An upper three-component mixing head 22 shown in FIG. 10 is used to produce the first polyurethane material U1, which is a high-performance material (e.g., a non-yellowing material having excellent light resistance), and a coloring material including pigment, an urethane reaction accelerating catalyst and a polyole component is used for the third component. The lower three-component mixing head 22 shown in FIG. 10 produces the second polyurethane material U2 and the third polyurethane component U3, which are made of ordinary grade materials (e.g., yellowing material), and a catalyst is added as necessary as the third component.

The injection mechanism 55 is equipped with a body 56 that is coupled to two injection nozzles 25, and the end of the body 56 has the form of narrow injection nozzle 57. A through hole 58 into which the two injection nozzles 25 open is formed in the center of body 56, and the spool 60, which is attached to a piston (not shown) of cylinder 59, is fitted into the through hole 58. The spool 60 is allowed to slide freely.

The following describes a second embodiment that embodies the present invention with reference to the drawings.

Figure 11:
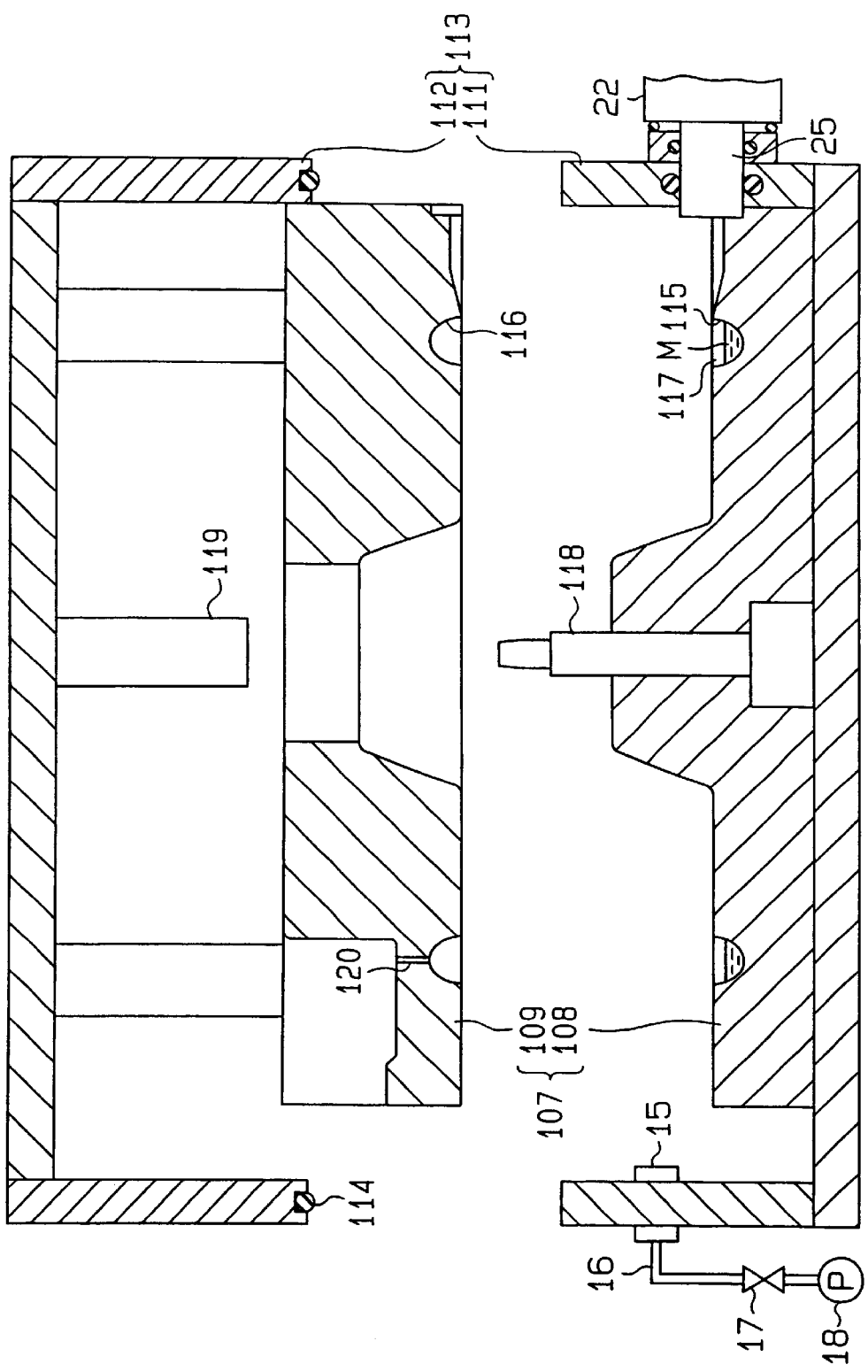
FIG. 11 is a cross-sectional view of a mold of a steering wheel of a second embodiment of the present invention.
Figure 12:
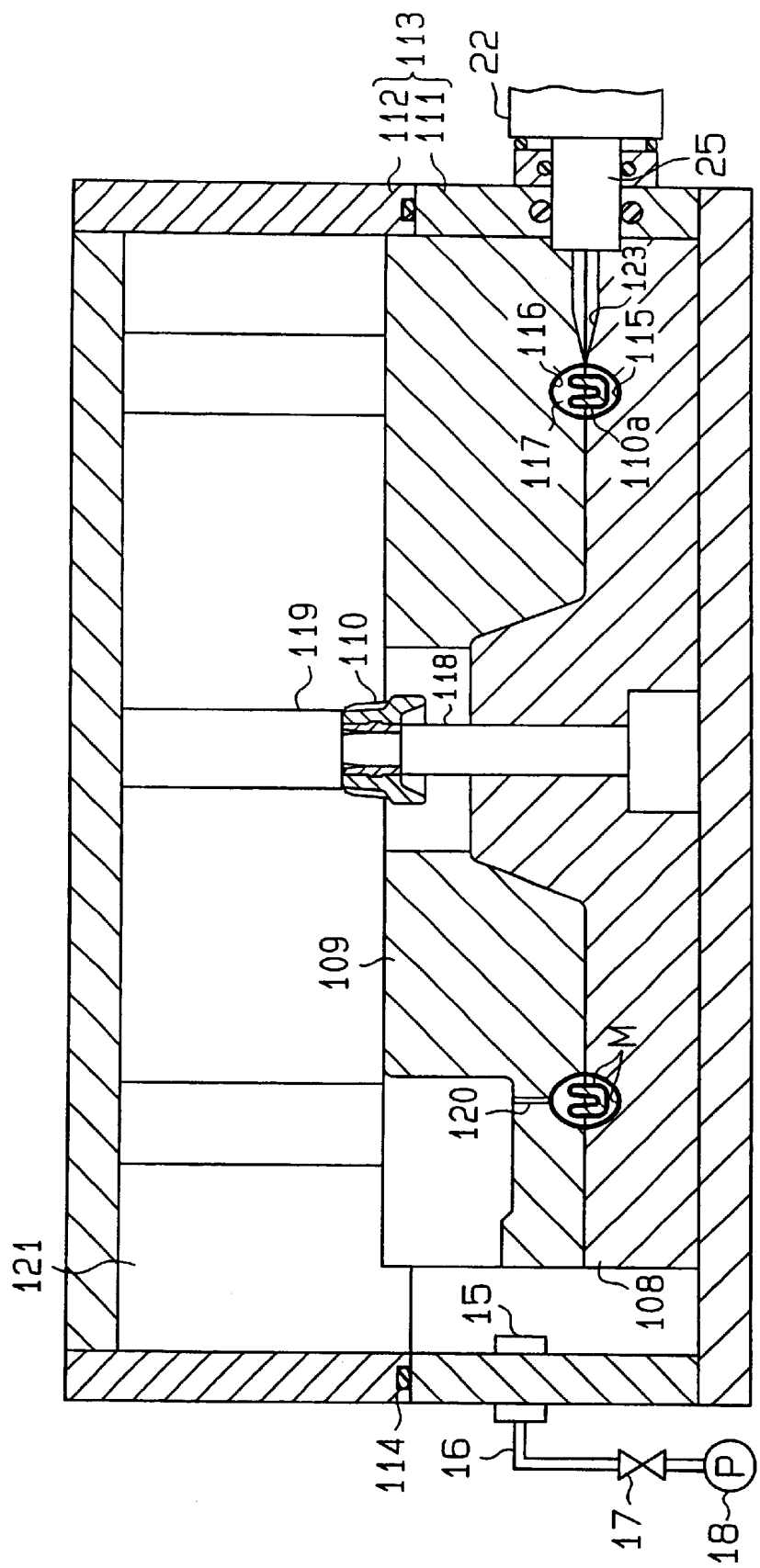
FIG. 12 is a cross-sectional view of a mold of the steering wheel of FIG. 11.
Figure 13:
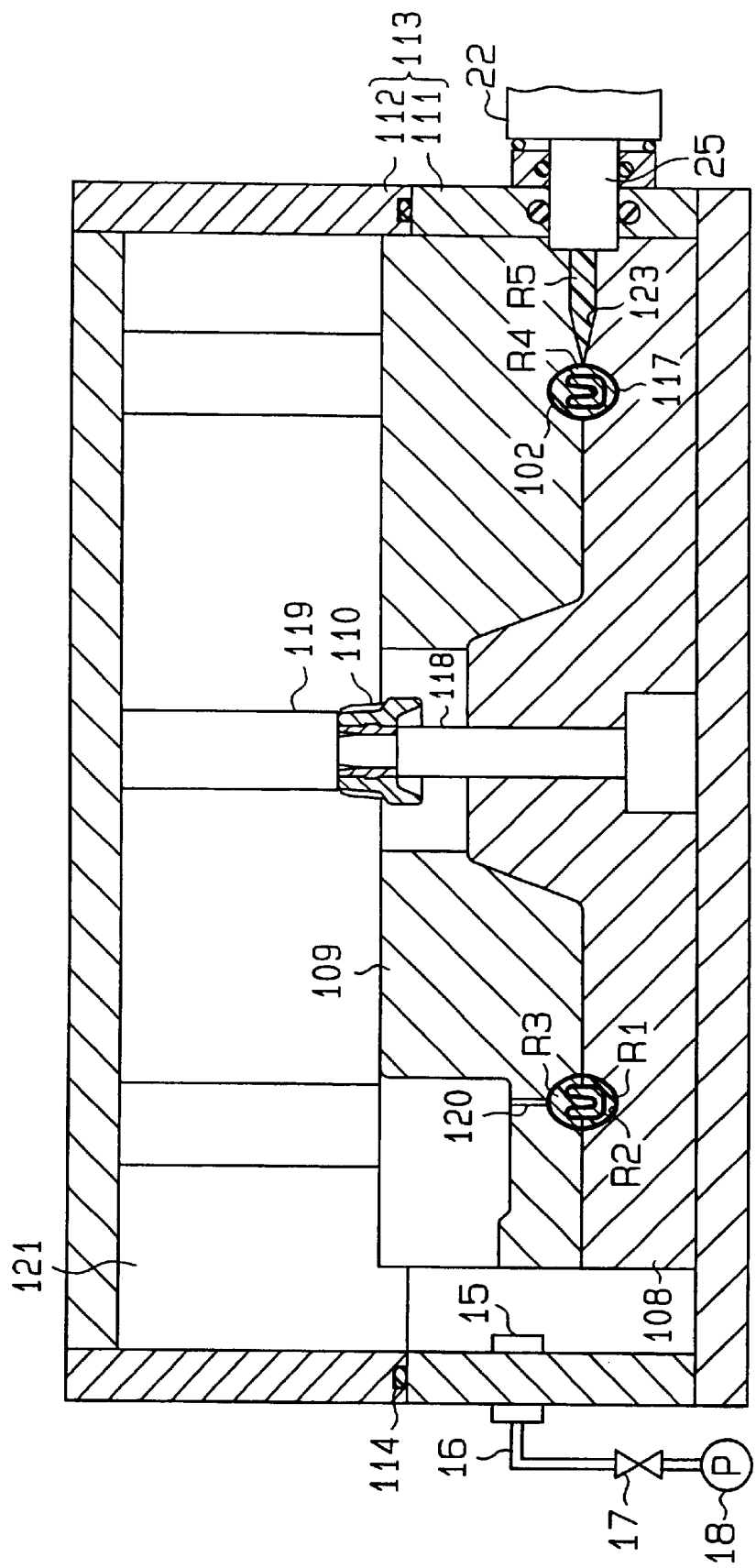
FIG. 13 is a cross-sectional view of a mold of the steering wheel of FIG. 11.
Figure 14:
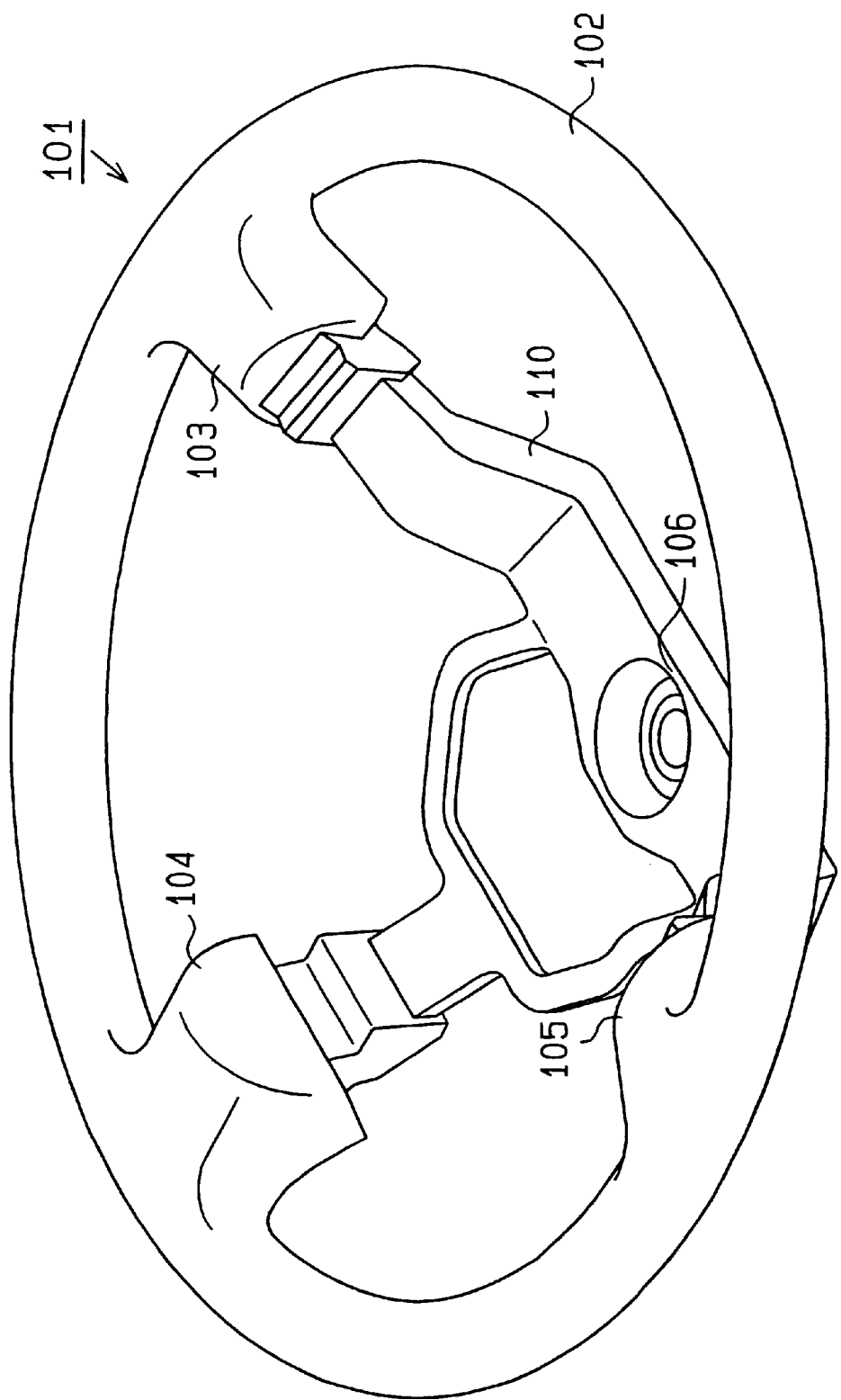
FIG. 14 is a perspective view of the steering wheel of FIG. 11.

FIGS. 11 through 13 are partial cross-sectional views of an injection molding machine in a second embodiment of the present invention, and FIG. 14 is a perspective view of an automobile steering wheel 1 that is molded by the injection molding machine.

As shown in FIG. 14, a steering wheel 101 has a ring 102, spokes 103, 104 and 105, and a boss 106. A mold 107 (consisting of a lower die 108 and an upper die 109) of an injection molding machine, as shown in FIGS. 11 through 13, is for covering the ring 102 and a core bar 110 of spokes 103, 104 and 105. In the present embodiment, foaming and molding of urethane resin is performed with the steering wheel 101 shown in FIG. 14 turned upside-down.

As shown in FIGS. 11 through 13, the mold 107 is arranged inside a box 113 composed of a frame 111 and a cover 112. More specifically, the lower die 108 is fixed in the frame 111, while the upper die 109 is fixed in the cover 112. In addition, a sealing member 114 is arranged in the cover 112 at the junction with the frame 111. The frame 111 and the lower die 108 are moved upward from the state of FIG. 11 to close the mold 107 with the core bar 110 set in the position shown in FIG. 12. Then, the mold 107 is clamped. At this time, the box 113 is formed by the frame 111 and the cover 112, and the inside of the box 113 is sealed by the sealing member 114. In addition, the core bar 110 of the present embodiment is manufactured by aluminum die-cast molding, magnesium die-cast molding or die-cast molding of an alloy of aluminum or magnesium. The cross-section of the ring 110a of the core bar 110 is U-shaped as shown in FIG. 12.

Indentations 115 and 116 are formed in the lower die 108 and the upper die 109, and the indentations 115 and 116 form a cavity 117 for producing molded articles. In addition, to fix the core bar 110 of the steering wheel 101 during molding, a fixing member 118 extends from the center of the lower die 108, and a fixing member 119 protrudes from the center of the upper die 109. A discharge hole 120 (having a cross-sectional surface area of, for example, 4 mm$^2$) is formed in the indentation 116 of the upper die 109, and the cavity 117 is connected to a hollow portion 121 in the box 113 by this discharge hole 120.

An injection nozzle 25 of a mixing head 22 similar to that of the previously described embodiment is arranged to the side of a side wall (the right side in the drawings) of the frame 111, and a urethane material mixed with the mixing head 22 is injected into the cavity 117 from the injection nozzle 25 through the gate 123. The urethane material is in liquid form and contains a polyole component, an isocyanate component and a coloring component, and these three components are mixed in the mixing head 22.

Next, the process for molding a urethane resin of steering wheel 101 in the present embodiment will be described referring to FIGS. 11 through 13.

To begin with, as shown in FIG. 11, a mold releasing agent is applied to wall surfaces of the cavity 117 (the indentation of 115 of the lower die 108 and the indentation 116 of upper die 109) after opening the mold 107. This mold releasing agent includes wax and silicone oil among other things. The mold releasing agent is applied to prevent adhesion of molded articles to the mold 107, which facilitates removal of the molded articles.

Next, the liquid coating material M (170 g in the present embodiment) is poured into the indentation 115 of the lower die 108 while keeping the mold 107 horizontal. The solution of the coating material M in the present embodiment contains methyl ethyl ketone (MEK), isopropyl alcohol (IPA) as a solvent, and urethane resin as the solid component. When the ratio of each component in the coating material M is indicated by wt %, the ratio of MEK is approximately 85%, IPA approximately 10% and the urethane resin 2.5%. The urethane resin contained in the coating material M has the same color as a urethane resin that is to be foam molded.

As shown in FIG. 12, the core bar 110 is placed in the mold 107, the mold 107 is closed and then clamped. At this time, the frame 111 and the cover 112 are sealed by the sealing member 114, which seals the inside of the box 113. In the present embodiment, the coating step for the cavity surface is performed with the mold 107 closed.

More specifically, the inside of the box 113 is depressurized by driving the vacuum pump 18 and evacuating air from inside the box 113 through the discharge tube 15. At this time, air inside the cavity 117 is drawn out into the hollow portion 121 inside the box 113 through the discharge hole 120, which creates a vacuum inside the cavity 117. When the inside of the cavity 117 is depressurized, the boiling point of the solvent (MEK, IPA) of the coating material M falls. As a result, the foam of the coating material M is broken up due to boiling accompanied by an increase in volume. More specifically, if the temperature of the mold 107 is held at 55° C. and the pressure inside the cavity 117 is reduced to 300 torr or less, the solvent boils. The coating material M is then coated onto the wall surfaces of the cavity 117 due to increasing volume and breaking up of the foam during boiling.

The solvent of the coating material M vaporizes and the urethane resin of the coating material M adheres to the wall surfaces of the cavity 117, which forms a coating layer on the wall surfaces of the cavity 117. In addition, at this time, together with the surface of core bar 110 in the cavity 117 being washed by the solvent of the coating material M, the coating material M, which serves as an adhesive, adheres to the surface of the core bar 110. In the present embodiment, the solvent is vaporized for about 60 seconds after the inside of the cavity 177 becomes depressurized to 50 torr. The vaporized solvent is then discharged from the vacuum pump 18 through the discharge hole, the hollow portion 121 in the box 113, the discharge tube 15 and so forth.

Figure 15:
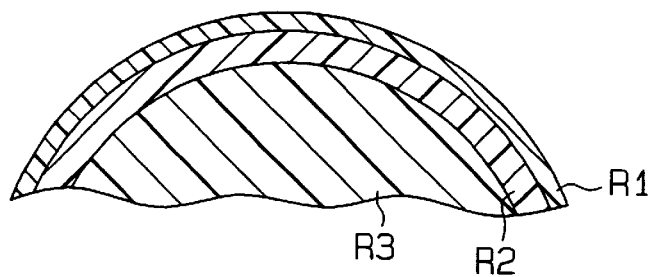
FIG. 15 is an enlarged cross-sectional view of the ring portion of the steering wheel of FIG. 11.

Next, the urethane material mixed with the mixing head 22 is injected into the cavity 117 from the injection nozzle 25 through the gate 123 while the cavity 117 is still depressurized. When this is done, the material reacts and is cured inside the cavity 117 as shown in FIGS. 13 and 15. As a result, a low foaming skin layer R2 and a high foaming core portion R3 are formed on the inside of the urethane resin layer R1 of the coating material M. Incidentally, FIG. 15 is an enlarged cross-sectional view of the ring 102 of the steering wheel 101.

More specifically, the spool 28 is retracted, and the polyole component and the isocyanate component are discharged from the nozzle 31 and from the nozzle 32, respectively, into the mixing chamber 30. Simultaneously, the valve 43c opens and the coloring material is discharged into the mixing chamber 30 from the discharge hole 52. Then, collide and mix these three components. At this time, the pigment concentration in the urethane material is adjusted to be, for example, 40% of the standard concentration. When the spool 28 is advanced, the mixed urethane material is injected into the cavity 117 from the injection nozzle 25. In other words, a first urethane material, in which the pigment concentration has been lowered to 40% relative to the standard concentration, is injected into the cavity 117 (first injection step).

When this is done, since gas contained in this urethane material rapidly forms a large number of bubbles under reduced pressure, the urethane material foams in a short period of time and fills the cavity 117 while flowing. Simultaneously, a reaction (urethane reaction) begins between the polyole component and the isocyanate component in the urethane material. Accompanying this reaction, heat is generated and curing proceeds. At this time, since the heat of reaction escapes to the mold 107, the urethane reaction on the surface of the molded article that is close to the wall of the cavity 117 proceeds slower than that inside the molded article, which limits an increase in the viscosity of the urethane material. Consequently, gas foam of the surface portion of the molded article is broken up easily under reduced pressure, which allows the gas to escape and results in the occurrence of extremely low foaming and a fine skin layer R2 that is free of residual micro gas bubbles. On the other hand, an increase in viscosity caused by the urethane reaction proceeds rapidly inside the molded article that spaced distance from the wall of the cavity 117, causing gas bubbles to remain, which forms a high foaming core portion R3. In this manner, as a result of the skin layer R2 being formed on the surface of the high foaming core portion R3, the steering wheel 101 is soft but also has a firm, smooth texture.

Then, the amount of coloring component discharged into mixing chamber 26 from the discharge hole 52 is increased, and the urethane material for which the pigment concentration is adjusted to the standard concentration (100%) is injected into the cavity 117 from the injection nozzle 25. In other words, a second urethane material is injected that contains more pigment than the first urethane material (second injection step). As a result, urethane resin R4 for the portion near the gate is formed as shown in FIG. 13. Thus, even if urethane resin R5 (the gate residue) is cut away, the appearance is not flawed since the urethane resin R4, which contains the pigment at the standard concentration, is exposed.

Figure 16:
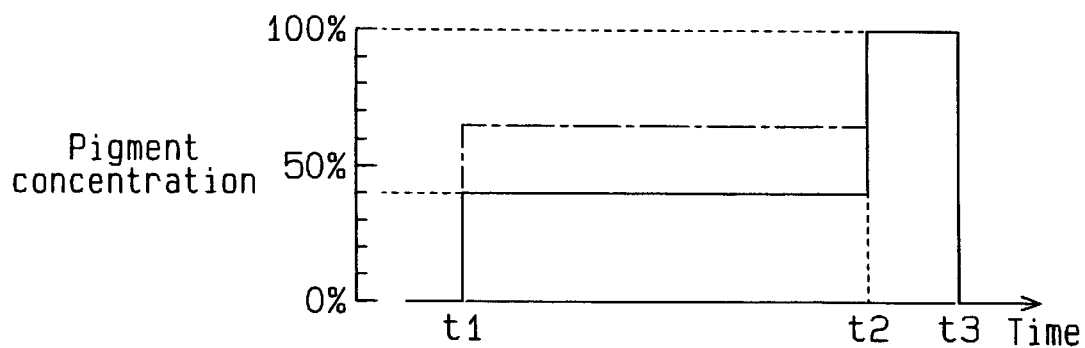
FIG. 16 is a timing chart showing the changes in pigment concentration during foam molding of a second embodiment.

FIG. 16 is a timing chart of the changes in pigment concentration during the above-mentioned molding. In other words, in the first injection step during the period from t1 to t2 as shown in FIG. 16, the skin layer R2 and the core portion R3 are formed in which the pigment concentration has been set to 40% relative to the standard concentration. In addition, in the second injection step, during the period from t2 to t3, the urethane resin U4, in which the pigment concentration is set at the standard concentration (100%), is formed near the gate.

In this manner of molding, the pigment concentration of the skin layer R2 provided under the coating film layer R1 is 40%, which is lower than the standard concentration. In addition, since the core portion R3 is foamed, its pigment concentration is relatively lower than that of the skin layer R2 resulting in a lighter color. Thus, since the colors of coating film layer R1, the skin layer R2 and the core portion R3 are seen as the sum of their respective pigment concentrations, the degree of coloring appears to be the same as the standard pigment concentration of the urethane resin U4.

The uniformly dashed broken line shown in FIG. 16 represents the changes in the pigment concentration in a comparative example in which foam molding of a urethane material was performed after coating the inside of the cavity with the coating material M with a spray gun. In this case, burrs are formed on the parting line. After removal of those burrs, the high foaming core portion is exposed. Consequently, it was necessary to increase the pigment concentration to, for example, 65% to an extent to which the appearance is not flawed during the period from t1 to t2 when the skin layer and the core portion are formed. However, according to the present embodiment, since the coating of coating material M at locations other than the cavity 117 is prevented, which inhibits the formation of burrs on the parting line, the pigment concentration can be reduced.

Molding and coating of the ring 102 and the spokes 103, 104 and 105 of the steering wheel 101 are performed simultaneously in this manner. In other words, the low foaming skin layer R2 and the high foaming core portion R3 both to include urethane resin, while a coating film of light-resistant urethane resin layer R1 is formed on the surface of the low foaming skin layer R2 at a nearly uniform thickness (e.g., 10 μm).

The mold 107 is then opened, and as shown in FIG. 14, the steering wheel 101, in which the ring 102 and the spokes 103, 104 and 105 are covered with the urethane resin, is removed to complete the molding process.

As has been described above, in the case of foam molding using a liquid urethane material, resin molding is performed under lower temperature and lower pressure conditions in the cavity 117 as compared with typical injection molding of a thermoplastic resin. Thus, the destruction of a coating layer formed on the wall surface of the cavity 117 due to pressure and temperature during molding does not occur. Moreover, since a urethane material is injected in the cavity 117 under a reduced pressure state, defects caused by the material moving around are decreased.

As has been described above, the following effects are demonstrated by the present embodiment.

(1) The pigment concentration of the skin layer R2 is lower than that of the urethane resin R4 near the gate. However, since there are hardly any air bubbles, the degree of coloring is nearly identical to that of the urethane resin R4. Further, since the coating material M is not coated at locations other than the cavity 117, burrs formed by foam molding are reduced. Thus, exposure of the core portion R3 caused by the burr removal is prevented. Moreover, if the inside of the cavity is coated with a spray gun (mold coating), the coating material M cannot be uniformly applied to the cavity 117 and coating is particularly inadequate at the parting line, causing the coating film to be thinner at that portion. In the present embodiment, however, a coating film of desired thickness can be nearly uniformly formed on the surface of the foam molded skin layer R2 by controlling the amount of coating material injected. Accordingly, since the urethane resin is concealed by this coating film, the pigment concentrations of the foam molded skin layer R2 and the core portion R3 can be reduced. In addition, even if the urethane resin R5 that remains on the gate is cut away, the urethane resin R4 in which the pigment concentration is set to the standard concentration is exposed. Thus, the appearance is not flawed.

According to that described above, the amount of the pigment contained in the urethane materials can be reduced without harming the appearance of the product, which lowers material costs. In addition, although pigment particles cause abrasion at the location where they pass through the mixing head 22, the amount of pigment used is reduced as mentioned above, so the abrasion is decreased. Accordingly, maintenance costs are reduced.

(2) Since a low foaming skin layer R2 is formed on the outside of high foaming core portion R3 as a result of foam molding using urethane material, among other things and wear resistance and texture are improved. In addition, a coating film of urethane resin layer R1 having excellent light resistance is formed at a nearly uniform thickness on the surface of the resin portion of steering wheel 101. As a result, light resistance uniform, and discoloration of urethane the resin skin layer R2 is limited. Moreover, there is no uneven coloring of the product surface. Accordingly, the steering wheel 101 has excellent performance including wear resistance, texture and light resistance. In addition, even if the coating film wears due to prolonged use, since the skin layer R2 is formed on the inside of the wheel, the appearance and texture are maintained.

(3) The coating material M is evenly and nearly uniformly applied to the wall surface of the cavity 117 due to the expansion and breaking up of the foam, which is produced by boiling the solvent. In this case, the adhesion efficiency is improved in comparison with a spray gun application of the coating material M (mold coating), which reduces the amount of coating material M. In addition, dispersion of coating material M to the outside is prevented, which results in a clean work area and prevents contamination of the surrounding environment.

(4) In the case of foam molding using urethane materials, since resin molding is performed under lower temperature and lower pressure conditions in the cavity 117, as compared with typical injection molding of a thermoplastic resin, destruction of the coating film layer applied to the wall of cavity 117 is prevented. In addition, although there is the risk of the coating film layer being destroyed by changes in pressure when the pressure in the cavity 117 is returned to normal after forming a coating film layer by depressurizing the inside of the cavity 117, by injecting urethane material while maintaining the reduced pressure condition as in the present embodiment, destruction of the coating film layer is prevented. Moreover, since foam molding of urethane materials is performed under reduced pressure, defects caused by the material moving around are decreased. Accordingly, the product yield is improved.

(5) Since the surface of the core bar 110 is washed by the solvent of coating material M, and urethane resin-based coating material M having excellent adhesion is applied to the surface of that core bar 110, the core bar 110 is securely adhered to the urethane resin.

The invention may be varied as follows.

Although the skin layer R2 and the core portion R3 are formed in a first injection step (period from t1 to t2 in FIG. 16) by injecting a first urethane material in which the pigment concentration is set to 40%, and urethane resin U4 is formed for the portion near the gate in a second injection step (period from t2 to t3 in FIG. 16) by injecting a second urethane material in which the pigment concentration has been set to the standard concentration (100%), the invention is not so limited. For example, since there are also cases in which the core portion R3 can be reliably concealed by the skin layer R2 and a coating film (urethane resin layer R1) depending on the shape of the molded article, color and so forth, foam molding may also be performed by reducing the pigment concentration of this core portion R3.

Figure 17:
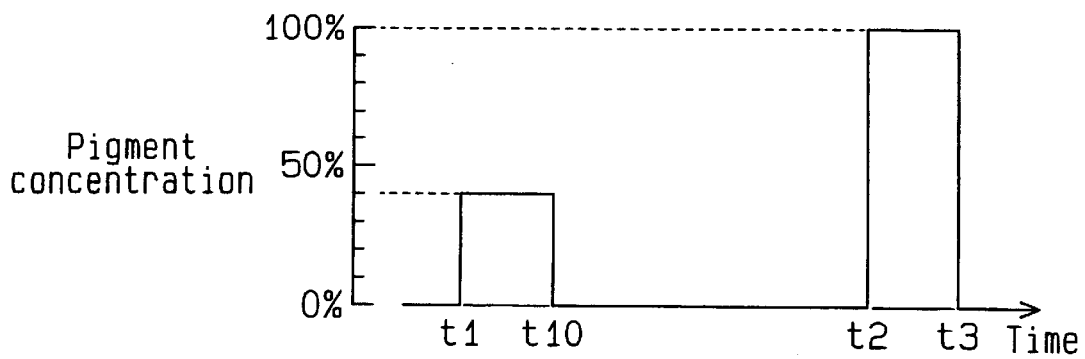
FIG. 17 is a timing chart showing the changes in pigment concentration of different foam molding.

More specifically, the skin layer R2 is formed by injecting a first urethane material in which the pigment concentration is set to 40% during the period from t1 to t10 shown in FIG. 17, and the core portion R3 is formed by injecting a urethane material not containing pigment so that the pigment concentration is 0% during the period from t10 to t2. Moreover, during the period from t2 to t3, urethane resin R4 for the portion near the gate is formed by injecting a second urethane material in which the pigment concentration is set to the standard concentration (100%). Naturally, although it is not necessary to inject a urethane material having a pigment concentration of 0% during the period from t10 to t2, a urethane material (third urethane material) should at least be injected in which the amount of pigment has been reduced to less than that of the first urethane material injected during the period from t1 to t10.

Incidentally, in the molding process shown in FIG. 17, the injection step during the period from t1 to t10 is equivalent to a first injection step, while the injection step during the period from t2 to t3 is equivalent to a second injection step. In addition, the injection step between the first and second injection steps, namely the injection step during the period from t10 to 2, is equivalent to a third injection step.

Moreover, the pigment concentrations of the skin layer R2 and the core portion R3 can be suitably changed according to the shape of the molded article, color and so forth. More specifically, foam molding may be performed by, for example, gradually lowering the pigment concentration during the period from t1 to t2 when the skin layer R2 and the core portion R3 are formed.

However, in the case of molding a steering wheel as in the above-mentioned embodiment, it is preferable to lower the pigment concentration in the surface urethane material to 40–80% of the standard concentration. In addition, it is preferable to lower the pigment concentration in the inside urethane material to 30–70% of the standard concentration.

Although a coating material solution is injected while the mold 107 is open in the above-mentioned embodiment, a coating material injection device may be provided separately, and composed so that the coating material M is injected into the cavity 117 from the coating material injection device while the mold 107 is closed. When this is done, the coating material solution can be injected into the cavity 117 during depressurization of the cavity enabling resin molding to be carried out in a short period of time. Further, since the coating material solution is injected in the cavity 117 when it is closed, leakage of the solvent of coating material M outside the injection molding machine can be prevented.

The present invention can also be applied to other molded parts such as an instrument panel, console box, glow box, head rest, arm rest, door cover, air spoiler or bumper, without being limited to the steering wheel 101. Naturally, the present invention may also be applied to molded articles of home appliances and so forth in addition to automotive parts.

The present invention may also be carried out by suitably changing the components of coating material M. More specifically, other heat-curing resins may be used instead of urethane resin. In addition, other solvents such as water may be used instead of methyl ethyl ketone (MEK) and isopropyl alcohol (IPA) for the solvent of coating material M. Alternatively, toluene and so forth may be added to the solvent of MEK and IPA. In practical terms, a solvent should be used that has a boiling point of 160° C. or lower.

Although the cavity 117 is depressurized to 50 torr by driving the vacuum pump 18 in the present embodiment, the present embodiment is not limited to this. The present invention may also be carried out by suitably changing the pressure reduction state in the cavity 117 corresponding to the drying time and applied state of the coating material solution or the thickness or other conditions of skin layer R2.

Therefore, the present examples and embodiments are to be considered as illustrative and not restrictive and the invention is not to be limited to the details given herein, but may be modified within the scope and equivalence of the appended claims.

What is claimed is:

1. A process for producing a urethane molded article by injecting a urethane material into a mold cavity from a gate and molding an article from the urethane material, the process comprising:
    a) forming a surface layer (R1, U1) on the inner surface of the cavity with the mold closed;
    b) injecting a first urethane material (R2, U2) containing pigment into the cavity; and
    c) injecting a second urethane material (R4, U3) containing pigment into the cavity, wherein the second urethane material (R4, U3) forms a portion near a gate area of the article, and wherein the pigment concentration of the first urethane material (R2, U2) is lowered to 30–70% of the pigment concentration of the second urethane material (R4, U3).

2. The process for producing a urethane molded article according to claim 1, wherein step a) is performed under reduced pressure.

3. The process for producing a urethane molded article according to claim 1, wherein step b) is performed under reduced pressure.

4. The process for producing a urethane molded article according to claim 1, wherein a third urethane material (R3), in which there is no pigment or the pigment concentration is less than that of the first urethane material (R2), is injected between step b) and step c).

5. The process for producing a urethane molded article according to claim 1, wherein the article is a covering of a steering wheel.

6. A process for producing a urethane molded article by injecting a urethane material into a mold cavity from a gate and molding articles from the urethane material, the process comprising:
    a) forming a low foaming skin layer (R2) by injecting into the cavity a urethane material in which the pigment concentration has been set to a prescribed concentration that is lower than a standard concentration;
    b) forming a high bubbling core portion (R3) by injecting into the cavity a urethane material (R4) in which the pigment concentration has been set to a prescribed concentration that is lower than the standard concentration; and c) forming a portion near a gate area of the article by injecting a urethane material in which the pigment concentration has been set equal to the standard concentration.

7. The process for producing a urethane molded article according to claim 6; wherein the pigment concentration in step b) is set lower than that of step a).

8. The process for producing a urethane molded article according to claim 6, wherein the pigment concentration of step a) is 40% of the standard concentration, and the pigment concentration of step b) is 0%.

9. The process for producing a urethane molded article according to claim 6, wherein the pigment concentrations during steps a) and b) are both 40% of the standard concentration.

10. A process for producing a urethane molded article, the process comprising:

depressurizing inside a mold cavity;

forming a surface portion of the molded article, wherein a first polyurethane material (U1), in which the pigment concentration has been lowered to 40–80% of a standard concentration, is injected into said cavity;

forming the majority of the inside of the molded article, wherein a second polyurethane material (U2), in which the pigment concentration has been lowered to 30–70% of the standard concentration, is injected into said cavity; and forming a portion near a gate inside the molded article, wherein a third polyurethane material (U3), in which the pigment concentration has been set to be equal to the standard concentration, is injected into said cavity.

11. The process for producing a urethane molded article according to claim 10, wherein the molded article is a covering of a steering wheel.

12. The process for producing a urethane molded article according to claim 10, wherein the first, second and third polyurethane materials (U1, U2, U3) contain a polyol component, an isocyanate component and a coloring material, respectively, and the coloring material contains pigment.

* * * * *

UNITED STATES PATENT AND TRADEMARK OFFICE
CERTIFICATE OF CORRECTION

PATENT NO. : 6,383,423 B1
DATED : May 7, 2002
INVENTOR(S) : Kurokawa et al.

It is certified that error appears in the above-identified patent and that said Letters Patent is hereby corrected as shown below:

<u>Title page,</u>
Please change "[73] Assignee: Toyoda Godei Co., Ltd., Aichi-ken, Japan; to
-- [73] Assignee: Toyoda Gosei Co., Ltd., Aichi-ken, Japan --

Signed and Sealed this

Twenty-sixth Day of November, 2002

Attest:

Attesting Officer

JAMES E. ROGAN
*Director of the United States Patent and Trademark Office*